June 2, 1953  I. STOKES ET AL.  2,640,983
PULSE-ECHO SIGNAL DISPLAY SYSTEM
Filed July 31, 1943  3 Sheets-Sheet 3

INVENTORS
IRVING STOKES &
LORIMER P. BROOKS
BY
William D. Hall
Attorney

Patented June 2, 1953

2,640,983

UNITED STATES PATENT OFFICE 2,640,983

PULSE-ECHO SIGNAL DISPLAY SYSTEM

Irving Stokes, Neptune, N. J., and Lorimer P. Brooks, Washington, D. C.

Application July 31, 1943, Serial No. 496,940

2 Claims. (Cl. 343—6.5)

(Granted under Title 35, U. S. Code (1952), sec. 266)

The invention described herein may be manufactured and used by or for the Government for governmental purposes, without the payment to us of any royalty thereon.

Our present invention relates to the visual representation of radio signals, and more particularly to a method and means whereby a simultaneous display of a plurality of such signals may be made through the use of a single indicating device, such as an oscilloscope.

While not limited thereto, our present invention is particularly useful for integrating the signal displays of combined radio systems for aircraft detection and identification.

In one form of such combined radio systems, the transmitter of a pulse-echo search system is used to scan the area surrounding a ground station with pulses of high frequency energy. Should such energy encounter any object in space, such as an aircraft, a portion thereof, known as an echo, is reflected or reradiated and received by the receiver at the search system where, together with a portion of the energy originally transmitted, it is applied to an indicating device, such as an oscilloscope, to measure the time interval between the original transmission and the reception of the echo, thereby determining the range of the particular object causing such echo.

The area surrounding the detecting station is also scanned with additional pulses of high frequency energy, generated by the transmitter of a pulse-response recognition system, those pulses being known as challenging or interrogating signals, which, upon encountering a friendly aircraft provided with an airborne unit, known as a transponder, trigger said transponder and cause the same to transmit responses which constitute identifying signals. These signals are received back at the ground station and are applied, together with a portion of said additionally transmitted energy, to an indicating device, such as an oscilloscope, to reveal to those on the ground whether the craft challenged is friendly or hostile. Obviously, if the oscilloscope displays no signals in response to the challenge, the craft is hostile, and vice versa.

It has heretofore been proposed to combine the two oscilloscope displays to which reference has been made and compare the time interval between the transmission of the challenging signals and any response thereto with the time interval between the pulse transmission of the detection system and any echo thereof. In order to make such comparison accurately it is necessary to synchronize the transmissions of both systems and also to display the visual indicia of such transmissions in perfect alignment. Only by so doing can the observer be sure to which of a plurality of echo indications displayed upon the oscilloscope does any particular observed response to the challenging signals correspond.

In combining the displays of both systems in accordance with this proposal it has been necessary to periodically displace the base line of the oscilloscope from its normal position, displaying the pulse transmission of the detection system and any echoes thereof upon said base line while it is in its normal position, and displaying the pulse transmission of the interrogation system and any responses thereto upon said base line while the same is in its displaced position.

However, we have found that the keying circuits of the systems cause the introduction of undesirable phase shifts whereby the visual indicia of the original pulse transmissions of both systems become out of alignment and accurate comparison cannot be made between the responses to the challenging signals displayed upon the displaced base line and the echo indications displayed upon the normal base line.

It is, therefore, the main object of our present invention to provide a method and means whereby radio signals, such as the pulse transmissions of aircraft detection and identification systems, may be aligned, upon oscilloscope base lines which are laterally displaced with respect to each other, in a direction normal to said base lines.

It is a further object of our present invention to provide a method and means whereby visual indicia of the original pulse transmissions of a combined radio system for aircraft detection and identification are so displayed as to enable the accurate and speedy matching of the identifying signals of friendly craft with the echo indications of the corresponding detected craft.

These, and other objects which will become obvious to those skilled in the art to which the present invention relates as the detailed description progresses, are attained in the present invention in the following manner: A portion of the pulses of electrical energy generated for example, by a spark gap keyer, is employed to key a radio frequency transmitter. A second portion of the keying energy is passed through a frequency divider and the output of the latter is used to key a second radio frequency transmitter. A third portion of the keying energy is employed for generating a sweep for an oscilloscope. Portions of the output of both transmitters are applied to one set of deflecting plates of the oscilloscope and the sweep is applied to the other set of deflecting plates of said oscilloscope.

A portion of the keying energy for the second transmitter is utilized to generate a negative square wave and this negative square wave is applied in part to the signal-receiving deflecting plates of the oscilloscope to periodically displace the base line thereof in synchronism with the transmission of said second transmitter. Said oscilloscope is thereby provided with two base lines displaced laterally with respect to each other, the signals generated by the first transmitter appearing upon the normal base line and the signals generated by the second transmitter appearing upon the displaced base line. However, because of inherent characteristics of the circuits through which the keying energy employed for pulsing the transmitters must be passed, phase shifts are introduced whereby the signals displayed upon the normal and displaced base lines are not in alignment. In order to correct this difficulty, a portion of the negative square wave employed, as above set forth, for laterally displacing the base lines, is passed through a bias regulating circuit and applied to the sweep circuit of the oscilloscope whereby a potential is introduced into said sweep circuit such as to shift the gradient of the deflecting field of the oscilloscope. The result is a shift of the displaced base line longitudinally with respect to the normal base line whereby any signals displayed thereon may be aligned in a direction normal to the base lines.

In the accompanying specification we describe and in the annexed drawings show an illustrative embodiment of the method and means of the present invention. It is, however, to be clearly understood that the specific embodiment shown and described herein is set forth merely for illustration and is not intended to limit the true spirit and scope of the present invention as expressed in the appended claims.

In said drawings,

Figure 2 is a schematic diagram of one form of bias regulating circuit which may be employed for attaining the signal alignment heretofore referred to;

Figure 1:
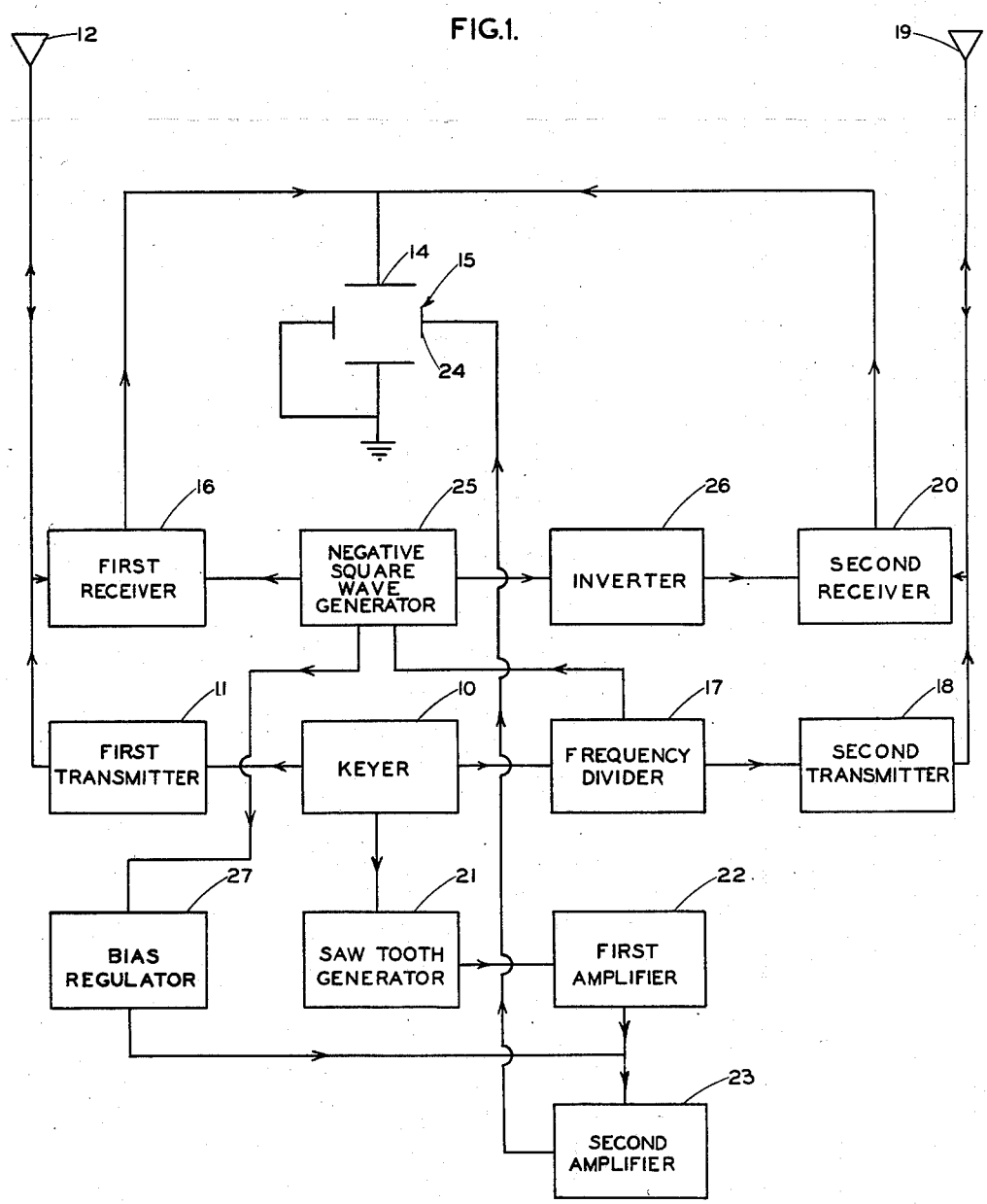
Figure 1 is a block diagram of the major components of a combined radio system for aircraft detection and identification assembled in accordance with the principles of the present invention.

Referring now more in detail to the present invention, with particular reference to Figure 1 of the drawings illustrating, in block form, a combined radio system for aircraft detection and identification, the numeral 10 designates any preferred keyer for generating short, sharp pulses of electrical energy at an audio frequency rate. Said keyer may include a sine wave oscillator and means to distort the output thereof into narrow, positive voltage peaks or may be of the spark gap type, in which case the pulses will be aperiodic in nature. A portion of the output of the keyer is utilized to modulate a first transmitter 11 which may be designed to generate high frequency energy and which constitutes the detection system transmitter.

The output of this transmitter, comprising audio frequency pulses of radio frequency energy is fed, through suitable transmission lines, to a highly directional antenna 12 mounted for rotation through 360° of azimuth whereby the area surrounding the ground station may be scanned in search of aerial targets.

The echoes of the energy radiated by the antenna 12 are received, preferably by the same antenna, detected by a receiver 16, and applied to the vertical plates 14 of the oscilloscope 15. The transmitted pulse is also picked up by the receiver and indicated on the oscilloscope.

A second portion of the output of the keyer 10 is passed through any preferred frequency divider 17 and the output of the latter is employed to modulate a second radio frequency generator 18 constituting the transmitter of the interrogation system. The output of the second transmitter, comprising pulses of high frequency energy at a lower pulse rate than the output of the first transmitter, is conveyed through suitable transmission lines to an antenna 19 by means of which said additional high frequency energy is made to scan the area surrounding the ground station. The antenna 19 is preferably mechanically coupled with the first antenna 12 whereby the radiations from both antennae are in directional alignment. As stated, the pulse rate of the second transmitter 18 is lower than that of the first transmitter 11. The purpose of this is to avoid jamming the airborne equipment carried by friendly aircraft and receptive of the challenging energy, in the event that a plurality of ground installations be directing such energy at the same craft at the same time.

The responses of friendly craft are received by the antenna 19, detected by a receiver 20, and, like the echoes to the pulse transmission of the detection system, are also applied to the vertical deflecting plates of the oscilloscope 15. The pulses transmitted by transmitter 18 are also picked up by receiver 20 and indicated on the oscilloscope.

A third portion of the output of the keyer 10 is transformed into a saw-tooth wave by a suitable saw-tooth generator 21 and the output of the latter is passed through a first amplifier 22 and a second amplifier 23 from which it is conveyed to the horizontal deflecting plates 24 of the oscilloscope 15, thereby providing the latter with a horizontal sweep linear with time.

In order to simultaneously display upon the oscilloscope the signals of both the detection and identification systems it is necessary that the oscilloscope have two base lines each receptive of the signals of one system. This can be attained in effect by periodically displacing the base line from its normal position, and because of the persistence of the oscilloscope screen, it will appear as if said oscilloscope is actually provided with two separate base lines. While not limited thereto, this effect may be secured as follows:

A portion of the output of the frequency divider 17 is fed to an appropriate negative square wave generator 25 and one portion of the output thereof is applied to the input circuit of the first receiver 16 whereby said receiver is rendered inoperative periodically in synchronism with the pulse transmission of the second transmitter 18. A second portion of the output of the negative square wave generator 25, after being passed through an inverter 26, is applied to the input circuit of the second receiver 20 to render said receiver, which is adapted to be normally inoperative, operative in synchronism with the pulse transmission of the second transmitter 18. The output of receiver 20 is applied to the vertical deflection plate 14.

By means of this arrangement the base line of the oscilloscope 15 is displaced laterally periodically in synchronism with the pulse transmission of the second transmitter 18 and, as a result, the pulse transmission of the first transmitter 11 may be displayed upon said base line while the same is in its normal position and the pulse transmission of the second transmitter 18 may be displayed upon said base line while the same is in its displaced position.

We have found, however, that due to phase shifts introduced into the system through inherent characteristics of the keying circuits, the signals of the transmitters 11 and 18, while displayed laterally with respect to each other, are not always in alignment, and in order to overcome this difficulty, a portion of the output of the negative square wave generator 25 is passed through a bias regulator 27 and then injected into the sweep circuit of the oscilloscope 15 intermediate the first and second amplifiers 22 and 23 thereof. The magnitude of this bias is under the control of the operator and is accomplished by introducing, into the sweep circuit of the oscilloscope, a D.-C. potential which, when applied to the horizontal deflecting plates 24 of the oscilloscope causes a shift in the gradient of the cathode ray deflecting field whereby the base line may be shifted a predetermined amount. Obviously, the amplitude of the D.-C. potential introduced into the sweep circuit governs the extent of the shift of the base line and the amplitude of the voltage so introduced is adjusted to a point where the oscilloscope display indicates the signals corresponding to the pulse transmissions of the transmitters 11 and 18 to be aligned in a direction normal to the axes of the base lines.

Figure 2:
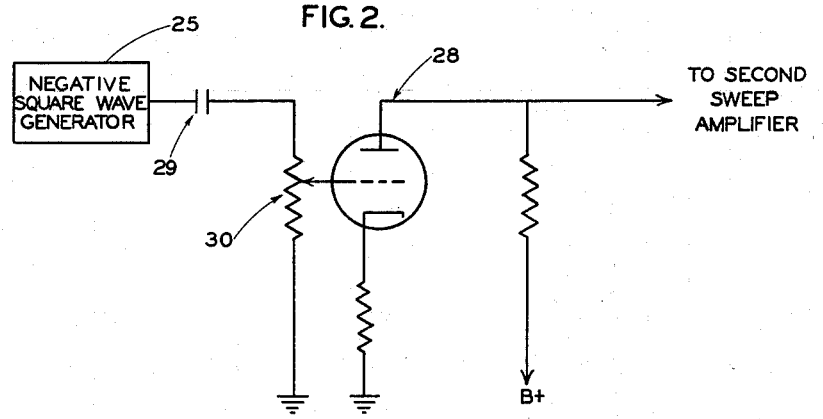

As shown in Figure 2 of the drawing the circuit for injecting the D.-C. potential into the oscilloscope sweep, the bias regulator 27 shown in Fig. 1, comprises a vacuum tube amplifier 28 coupled to the negative square wave generator 25 through a capacitor 29 and potentiometer 30, the output of this stage being superimposed upon the input to the second amplifier 23 (Figure 1) of the sweep circuit. By means of this arrangement the base line of the oscilloscope may be shifted in one direction only, for the polarity of the voltage introduced into the oscilloscope sweep is always the same.

Should it be desirable to shift the displaced base line in either direction relative to its initial position with respect to the normal base line it becomes necessary to provide a circuit enabling the introduction into the sweep of both positive and negative potentials. Such a circuit is shown in Figure 3 of the drawings.

As there shown, we provide a generator 31 for producing a positive or negative square wave. This generator is coupled, through a capacitor 32, to a vacuum tube amplifier 33 connected to provide a plate output and a cathode output, said outputs being, of course, 180° out of phase. The plate return is made through a capacitor 34 and potentiometer 35 and the cathode return is made through a capacitor 36 and potentiometer 37. The potentiometers are ganged to constitute a differential network and the composite output thereof is applied to a vacuum tube amplifier 38, the plate output of which comprises a positive or negative-going square wave the amplitude of which depends upon the positions of the take-off arms of the potentiometers. This output, like that of the amplifier 28 (Figure 2) is superimposed upon the input to the second amplifier 23 (Figure 1) of the oscilloscope sweep circuit and causes a shift in the gradient of the deflecting field of the oscilloscope the direction of said shift depending upon the polarity of the net voltage across the differential potentiometers.

Figure 3:
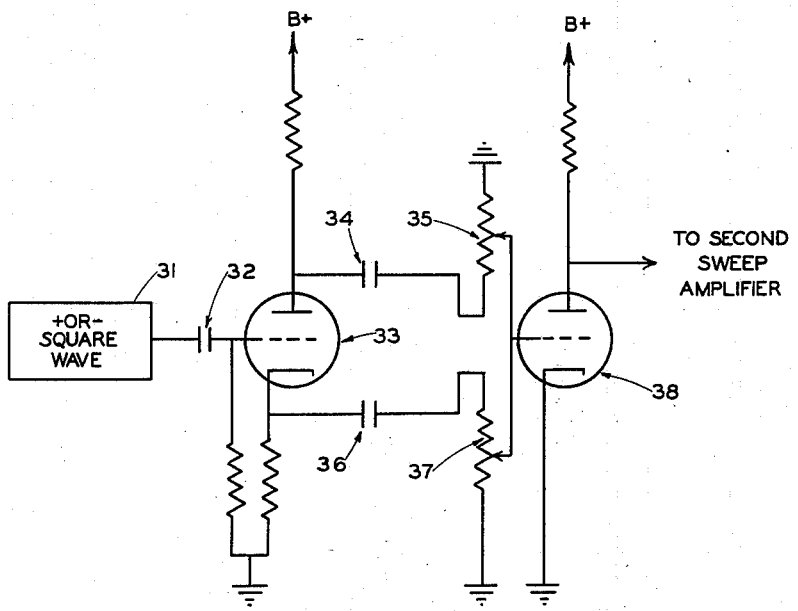
Figure 3 is a schematic diagram of a modified form of said bias regulating circuit.

Were the circuit shown in Fig. 3 substituted for the analogous blocks in Fig. 1, block 31 would replace block 25, and the elements 32—38 would comprise the bias regulator 27.

Figure 4:
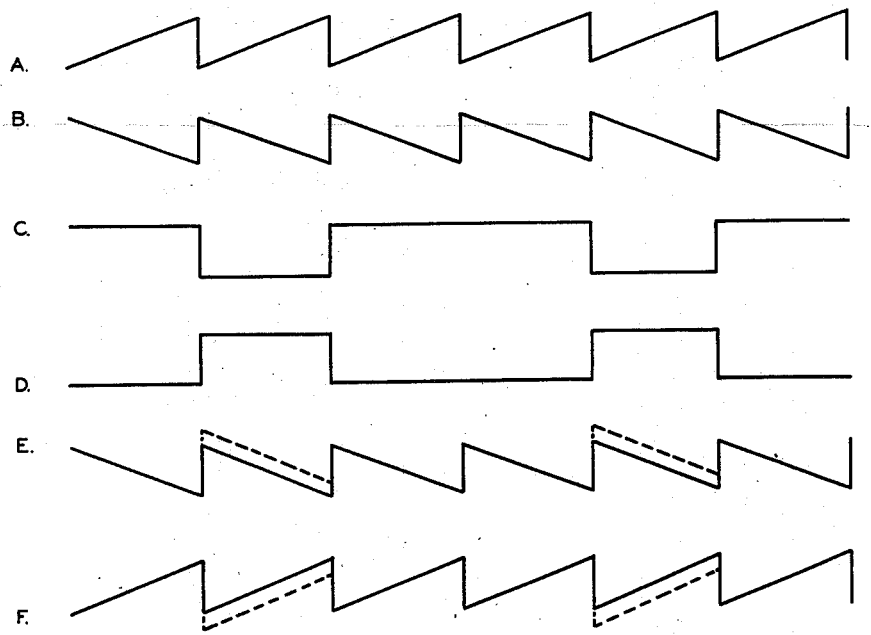
Figure 4 shows the wave shapes associated with certain of the circuit components of the present invention.

By reference to Figure 4–A of the drawings the shape of the wave produced by the saw-tooth generator 21 (Figure 1) may be seen. This wave is inverted upon being passed through the first amplifier 22, as shown in Figure 4–B.

The output of the generator 25 is a negative-going square wave as shown in Figure 4–C and this wave is inverted, as may be seen from Figure 4–D, upon passing through the vacuum tube amplifier 28 (Figure 2).

When the output of the amplifier 28 is combined with the sweep input to the second amplifier 23, the resulting input to said second amplifier 23 is as shown in Figure 4–E, where the negative-going saw-tooth wave has superimposed thereon, as shown in broken lines, a D.-C. potential or bias which raises the level of the saw-tooth wave in synchronism with the pulse transmission of the interrogation transmitter 18. Upon passing through said second amplifier 23, this wave is inverted, as shown in Figure 4–F.

Figure 5:
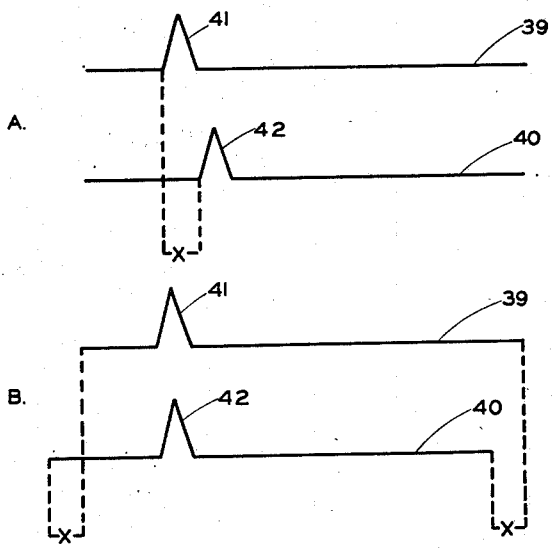
Figure 5 shows typical oscilloscope signal displays before and after operation thereon by the circuits of the present invention.

In Figure 5–A we have shown a typical oscilloscope picture, including a normal base line 39 and a second base line 40 laterally displaced with respect to the normal base line. Upon the normal base line there is superimposed a pip 41 corresponding to the pulse transmission of the detection system transmitter 11 (Figure 1) and upon the displaced base line there is superimposed a pip 42 corresponding to the pulse transmission of the interrogation signal transmitter 18 (Figure 1). It will be noted that the pips 41 and 42 are not in alignment, the extent of their misalignment being indicated by the phase shift designated X. By introducing into the oscilloscope sweep circuit a D.-C. potential or bias of proper polarity and amplitude this phase shift is compensated for and the displaced base line is shifted so that the pips become aligned, as shown in Figure 5–B, in a direction normal to the base lines. In this figure, the phase difference between the base lines, again designated by the letter X, appears at the beginning and end of the lines, where they have no effect upon the operation of the system.

We have thus provided a method and means whereby a plurality of radio signals, such as the pulse transmissions of aircraft detection and identification systems, may be simultaneously displayed in alignment upon an oscilloscope having base lines which are laterally displaced with respect to each other, said alignment being in a direction normal to said base lines. By providing such alignment, any responses to the interrogation signals of the identification system which may be displayed upon the displaced base line may readily be matched with the corresponding echo indications of the detection system which may be displayed upon the normal base line, thereby affording positive identification of each of the aircraft detected by the detection system.

Although, in the embodiments shown and described herein we have indicated a preference for shifting the second base line with respect to the first or normal base line, it is obvious that the procedure can be reversed; that is, the normal base line can be shifted in the appropriate direction with respect to the displaced base line to effect alignment of the signals displayed upon each base line.

While we have shown and described herein certain specific circuits and uses therefor, it is to be clearly understood, as indicated in earlier portions of this specification, that we do not wish to be limited thereto. Said circuits and the use thereof are set forth merely by way of illustration and are not intended to limit the true spirit and scope of the invention as expressed in the appended claims.

We claim:

1. In combination with an oscilloscope provided with vertical and horizontal deflection means, means coupled to said vertical and horizontal deflection means for producing a pair of base lines laterally displaced with respect to each other; means for applying synchronized signals to said base lines, and means for shifting one of said base lines longitudinally with respect to the other whereby the traces of the synchronized signals applied thereto may be aligned in a plane normal to said base lines, said last named means including an electrical circuit synchronized with the sweep circuit of said oscilloscope for generating a square wave voltage, a vacuum tube amplifier receptive of said square wave voltage connected to provide a plate output and a cathode output, a pair of ganged potentiometers connected to said plate and cathode outputs, respectively, for combining said outputs and means for applying said combined output to said horizontal deflection means for longitudinally shifting the position of one of said base lines with respect to said other base line.

2. In combination with an oscilloscope provided with vertical and horizontal deflection means, means coupled to said vertical and horizontal deflection means for producing a pair of base lines laterally displaced with respect to each other; a circuit for shifting longitudinally in either direction one of said base lines with respect to the initial position of the other; said circuit comprising a sweep circuit providing the sweep voltage for said one base line, a square wave generating means synchronized with the initiation of the sweep of said one base line for providing square wave signals of adjustable polarity and amplitude, means connected to the outputs of said sweep circuit and said square wave generating means for mixing the sweep voltage for said one base line and said square wave signals, and means for applying the output of said last named means to said horizontal deflection means of said oscilloscope.

IRVING STOKES.
LORIMER P. BROOKS.

References Cited in the file of this patent

UNITED STATES PATENTS

| Number | Name | Date |
|---|---|---|
| 2,098,390 | Iams | Nov. 9, 1937 |
| 2,178,218 | Bedford | Oct. 31, 1939 |
| 2,189,549 | Hershberger | Feb. 6, 1940 |
| 2,221,115 | Shepard, Jr. | Nov. 12, 1940 |
| 2,252,083 | Luck | Aug. 12, 1941 |
| 2,252,599 | Lewis | Aug. 12, 1941 |
| 2,261,762 | Hazeltine | Nov. 4, 1941 |
| 2,274,098 | Shore | Feb. 24, 1942 |
| 2,278,641 | Bond | Apr. 7, 1942 |
| 2,286,894 | Browne et al. | June 16, 1942 |
| 2,349,687 | Williams | May 23, 1944 |
| 2,367,728 | Mahoney, Jr. | Jan. 23, 1945 |
| 2,403,429 | Anderson | July 9, 1946 |
| 2,405,231 | Newhouse | Aug. 6, 1946 |
| 2,426,217 | Hoisington | Aug. 26, 1947 |
| 2,471,373 | Joyner | May 24, 1949 |